United States Patent
Miura (10) Patent No.: US 11,603,962 B2
(45) Date of Patent: Mar. 14, 2023

(54) SUPPORTING MECHANISM AND SUPPORTING DEVICE HAVING THE SAME

(71) Applicant: KEM HONGKONG LIMITED, Tsimshatsui Kowloon (HK)

(72) Inventor: Fumiaki Miura, Kanagawa (JP)

(73) Assignee: KEM HONGKONG LIMITED, Tsimshatsui Kowloon (HK)

( * ) Notice: Subject to any disclaimer, the term of this patent is extended or adjusted under 35 U.S.C. 154(b) by 65 days.

(21) Appl. No.: 17/337,509

(22) Filed: Jun. 3, 2021

(65) Prior Publication Data

US 2021/0388943 A1    Dec. 16, 2021

(30) Foreign Application Priority Data

Jun. 15, 2020 (JP) .............................. JP2020-103077

(51) Int. Cl.
  *F16M 11/00* (2006.01)
  *F16M 13/02* (2006.01)
  *F16M 11/08* (2006.01)

(52) U.S. Cl.
  CPC .......... *F16M 13/022* (2013.01); *F16M 11/08* (2013.01)

(58) Field of Classification Search
  CPC .. F16M 13/022; F16M 11/08; F16M 11/2064; F16M 2200/068; F16M 11/2014; F16M 11/24; F16M 2200/027; F16M 2200/022
  See application file for complete search history.

(56) References Cited

U.S. PATENT DOCUMENTS

| | | | |
|---|---|---|---|
| 2020/0191321 A1* | 6/2020 | Kleist | F16M 11/10 |
| 2021/0239262 A1* | 8/2021 | Lim | F16M 11/2092 |
| 2022/0082206 A1* | 3/2022 | Walker | F16M 11/2092 |

FOREIGN PATENT DOCUMENTS

JP          200583538 A    9/2003

* cited by examiner

*Primary Examiner* — Amy J. Sterling
(74) *Attorney, Agent, or Firm* — Notaro, Michalos & Zaccaria P.C.

(57) ABSTRACT

A supporting mechanism for a supporting device that supports supporting arms to which a pressing down load is applied on one side relative to an attaching element such that the former are mobile at least in a horizontal direction, as well as a supporting device having a supporting mechanism is disclosed. The solution is sought by using a swivel torque hinge having a friction torque generating mechanism using elastic members such as friction washers and spring washers for the supporting mechanism by pivotally supporting a shaft upper portion of a hinge shaft of the swivel torque hinge on an attaching hole portion provided on the supporting arms by providing a bracket supporting the supporting arms on the hinge shaft via the friction torque generating mechanism.

7 Claims, 12 Drawing Sheets

SUPPORTING MECHANISM AND SUPPORTING DEVICE HAVING THE SAME

FIELD OF THE INVENTION

The invention relates to a supporting mechanism suitable in use for a supporting device which supports a supported device such as a display for monitor, such that the former is mobile relative to an attaching element such as an attaching base in horizontal, longitudinal and vertical directions; the invention also relates to a supporting device having the supporting mechanism.

BACKGROUND ART

JP Laid-Open Patent Application No. 2005-83538 discloses a supporting mechanism for a supporting device which uses supporting arms to hold various kinds of equipment such as a display for monitor and office equipment relative to an attaching base such as work desk and to support the above-mentioned equipment such that the former is mobile in horizontal, longitudinal and vertical directions.

In the supporting mechanism for a supporting device of the equipment disclosed in JP Laid-Open Patent Application No. 2005-83538, a section around the attaching base is coupled to that around the equipment using the supporting arm, or the supporting arms to each other using a swivel torque hinge. Here, a swivel torque hinge refers to a hinge which couples a coupled object in a horizontally rotational manner and comprises a friction torque generation mechanism.

In a supporting device for a supported device such as a display for monitor, as is disclosed in JP Laid-Open Patent Application No. 2005-83538, a problem lies in that a load applied to a friction torque generating mechanism of a swivel torque hinge being a supporting mechanism via a supporting arm shifts toward one side (i.e. a section around a display device for the monitor), which makes a rotational torque unstable to cause variations in a stopping state or sliding force of equipment. Furthermore, there is another problem that an offset load applied to axial urging members such as spring washers provided on a swivel torque hinge may cause aging variations in friction torque of the above-mentioned friction torque generating mechanism, as well as a deterioration in durability of the swivel torque hinge. Still further, there is a need for the supporting mechanism for further reducing the occurrence of hanging down of the supporting device, as the supported device is enlarged.

SUMMARY OF THE INVENTION

The invention is intended to solve the above-mentioned problems, and has an object to provide a supporting mechanism capable of reducing the offset load applied to the friction torque generating mechanism, as well as a supporting device having the supporting mechanism.

To achieve the above-mentioned object, a supporting mechanism according to the invention is a supporting mechanism for a supporting device which supports supporting arm(s) to which a pressing down load is applied on one side relative to an attaching element such that the former is/are mobile at least in a horizontal direction, wherein a swivel torque hinge comprising a friction torque generating mechanism using elastic members such as friction washers and spring washers is used for the supporting mechanism, characterized in that the supporting mechanism is structured by pivotally supporting a shaft upper portion of a hinge shaft of the swivel torque hinge on an attaching hole portion provided on the supporting arm(s), providing a bracket supporting the supporting arm(s) is on the hinge shaft via the friction torque generating mechanism, such that the former is rotatable with friction relative to the hinge shaft, by rotatably attaching a fixing guide member is to the hinge shaft while in contact with the bracket, and by jointly fastening the supporting arm(s), the bracket and the fixing guide member to each other via attaching screws.

Here, in a supporting mechanism according to the invention, shaft bearing member(s) is/are mounted on one or both of supporting arm(s) and a fixing guide member as described above.

The invention is also characterized in that shaft bearing member(s) is/are attached on one or both of supporting arm(s) and a fixing guide member as described above.

The invention is also characterized in that if a plurality of the supporting arms are used, the supporting mechanism according to the invention is also used at coupling points between the supporting arms.

The invention is also characterized in that a hinge shaft of the swivel torque hinge is attached to an attaching element via attaching mechanism.

The invention is also characterized in that a hinge shaft of the swivel torque hinge is mounted to one of supporting arms, where a plurality of the supporting arms are given.

The invention is also characterized in that an attaching element is a supporting base such as a desk.

A supporting device according to the invention is also characterized in that it uses a supporting mechanism as in each of the above-mentioned aspects.

According to the invention, a shaft upper end portion of a hinge shaft of the swivel torque hinge is pivotally supported on an attaching hole portion provided on the supporting arm(s), a bracket supporting the supporting arm(s) is/are provided on the hinge shaft via the friction torque generating mechanism, such that the former is rotatable with friction relative to the hinge shaft, a fixing guide member is rotatably attached to the hinge shaft while in contact with the bracket, and the supporting arm(s), the bracket and the fixing guide member are jointly fastened to each other via attaching screws; this allows to provide a supporting mechanism and a supporting device using the supporting mechanism, wherein the offset load applied to the friction torque generating mechanism can be attenuated, so that the durability of the friction torque generating mechanism can be improved.

Here, when shaft bearing members are attached to an attaching hole portion provided on an attaching hole portion of a supporting arm pivotally supporting a tip portion of a hinge shaft and/or to a shaft insertion hole provided on a fixing guide member, the invention has an effect that a rotation movement of supporting arms becomes smoother.

Still further, a supporting device having a supporting mechanism as mentioned above may comprise excellent features of the supporting mechanism as mentioned above.

EMBODIMENTS

Figure 1:
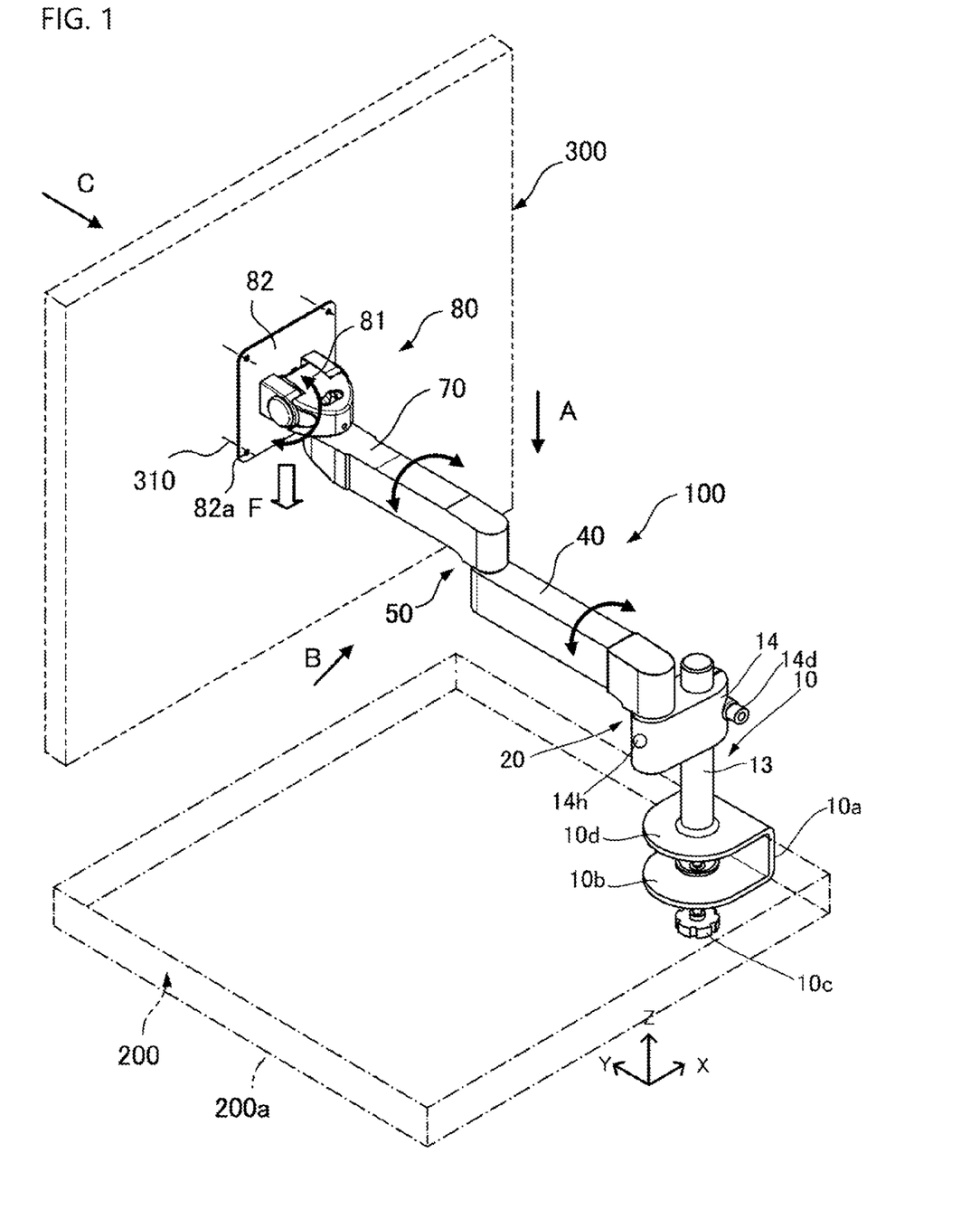
FIG. 1 shows a perspective view of a supporting device according to an embodiment of the invention.
Figure 2A:
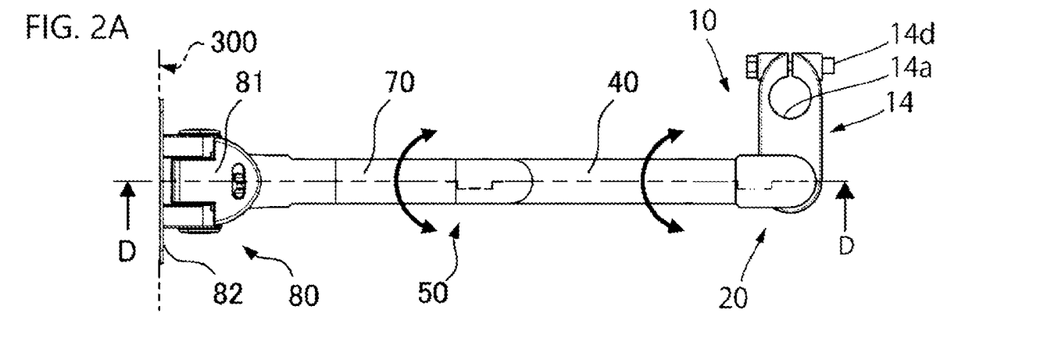
FIGS. 2A to 2C show a supporting device as shown in FIG. 1 without lifting device, FIG. 2A being a detail drawing viewing from A, FIG. 2B a detail drawing viewing from B, and FIG. 2C a detail drawing viewing from C, of FIG. 1.
Figure 2B:
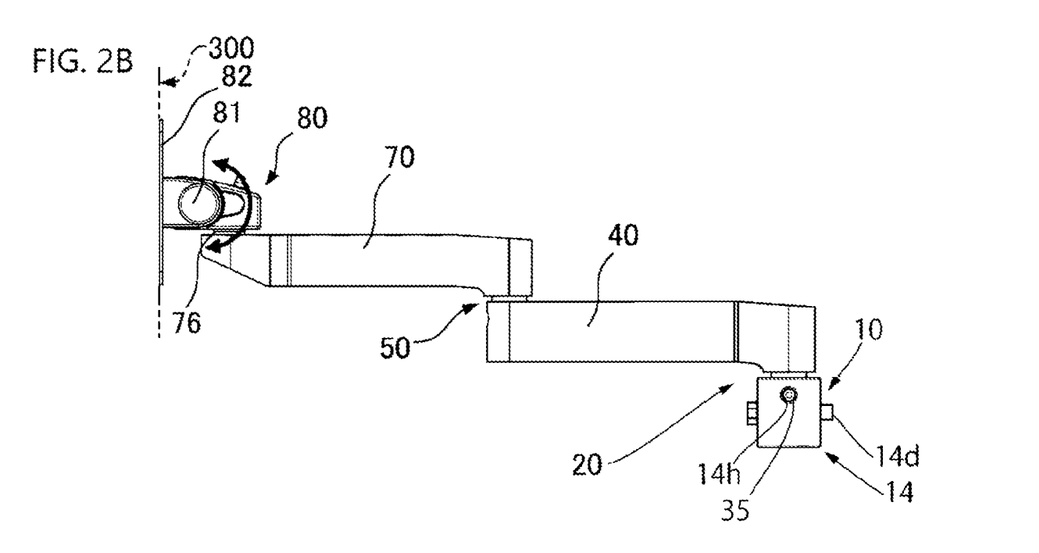
Figure 2C:
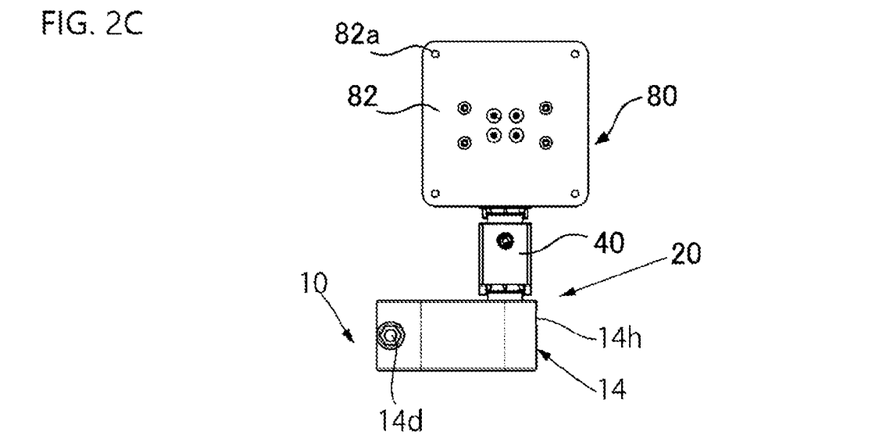

In the following, reference is made to a supporting device 100, as well as to supporting mechanisms 20, 50 used for the supporting device 100, with reference to the drawings. It is noted that the following description is based on x-, y- and z-axes as shown in FIG. 1 to define a direction within an xy plane as a horizontal, a direction of an arrow along z-axis as upward, and that of an arrow along y-axis as forward. Further in the drawings, rotatable directions are shown using two-way arrows as are necessary.

Figure 3:
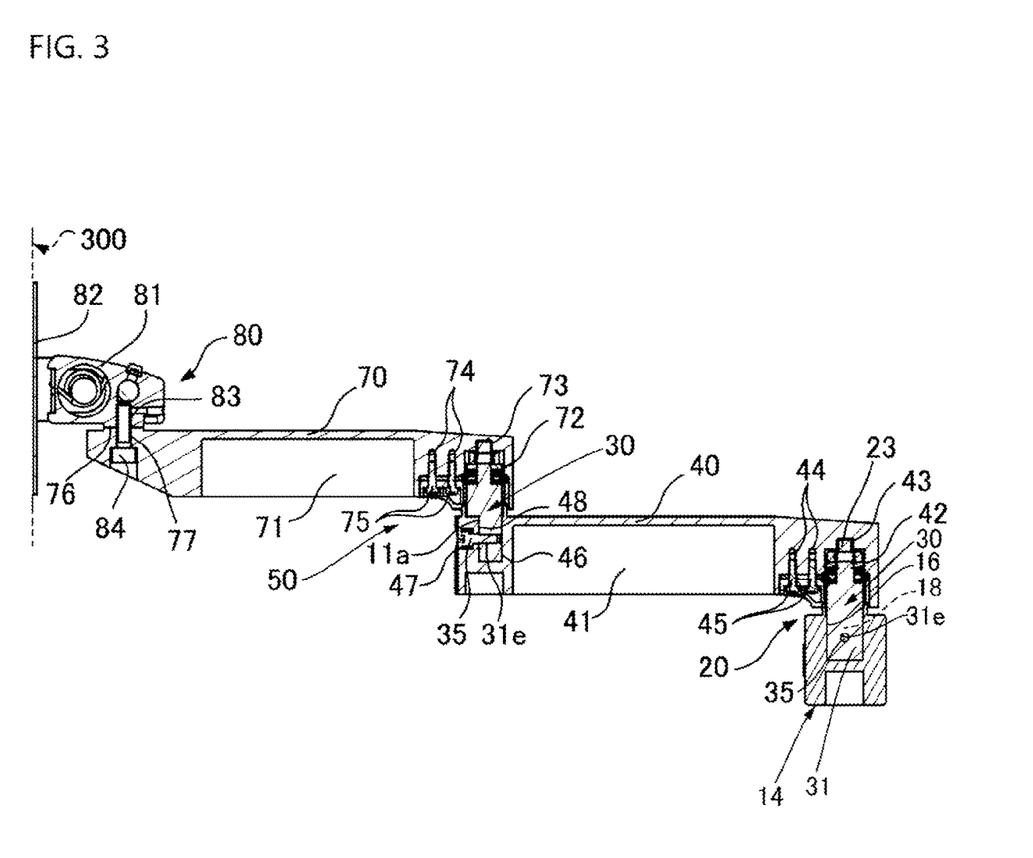
FIG. 3 shows a cross section in line D-D in FIG. 2A.

First, as shown in FIGS. 1 and 3, a supporting device 100 comprises a lifting device 10 being an example of attaching mechanism a top plate 200 a of a desk 200 being an example of attaching element, a first supporting arm 40 attached to an attaching member 14 of the lifting device 10 via a first supporting mechanism 20, such that its one end portion is swingable in a horizontal direction, a second supporting arm 70 attached to the other end portion of the first supporting mechanism 20 via a second supporting mechanism 50 to be swingable in a horizontal direction, and a monitor attaching portion 80 such as a display device for monitor attached on its tip side to be swingable in vertical and crosswise directions.

It is noted that the supporting device may comprise only a single supporting arm and/or a monitor attaching portion 80 without using universal joint hinge. Therefore, a supporting device 100 is not limited to what is described in this embodiment. Still further, as per structure of the first supporting mechanism 20 and the second supporting mechanism 50, both differ only in that one is attached to the lifting device 10, while the other to the first supporting arm 40, and are almost the same in structure; therefore, the description is sometimes omitted for the second supporting mechanism 50. Therefore, the description and claims of this application sometimes simply refer to it as supporting mechanism.

Figure 12:
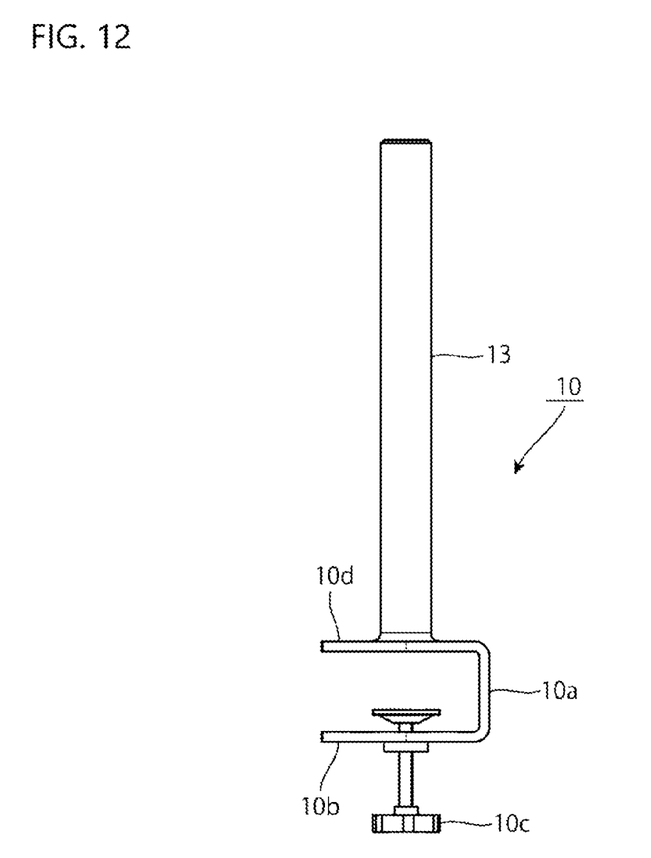
FIG. 12 shows a elevation view of a lifting device used in a supporting device as shown in FIG. 1.

As shown in FIGS. 1 and 12, a lifting device 10 being an example of attaching mechanism according to the embodiments is composed of a fixing member 10a having a cross section in the shape of C sandwiching a top plate 200 a of a work desk 200, a fastening screw 10c attached to a lower piece portion 10b of the fixing member 10a to fix the fixing member 10a to the top plate 200a, a pipe-shaped column 13 attached to an upper piece portion 10d of the fixing member 10a, and an attaching member 14 attached to the column 13 to be vertically movable. In particular as shown in FIG. 1, the lifting device 10 is fixed to the work desk 200, and a display device for monitor 300 is attached to a monitor attaching portion 80 on the other end. In this manner, a force F of the display device for monitor 300 e.g. equivalent to a mass of ca. 10 kg being a downward load is applied to the monitor attaching portion 80.

It is noted that attaching mechanism are not limited to the lifting device 10, but include the other object such as an attaching base attached on the work desk 200. Still further, an attaching element is not limited to a work desk, but include other kinds of desk and wall; thus it is not limited to what is described in this embodiment.

Supporting mechanisms consist of a first supporting mechanism 20 for swingably supporting a first supporting arm and a second supporting mechanism 50 for swingably equally supporting a second supporting arm, and as per their structure, they use swivel torque hinges 30, 30 both identically structured. Thus a detailed description is made for the first supporting mechanism 20, while the structure of the second supporting mechanism 50 is simply described or not described at all.

The first supporting arm 40 is an arm member extending in a horizontal direction from the first supporting mechanism 20, with one end being supported by the first supporting mechanism 20. The first supporting mechanism 20 is provided on one end of the first supporting arm 40 and its other end is an attaching member of the second supporting mechanism 50. As the first supporting mechanism 20 rotates, the other end of the first supporting arm 40 is swung around a central axis of the first supporting mechanism 20 to the right and the left in a horizontal direction.

The second supporting mechanism 50 is a supporting mechanism of a second supporting arm 70 coupled to the other end of the first supporting arm 40.

The second supporting arm 70 is an arm member extending in a horizontal direction from the second supporting mechanism 50, with one end being supported by the second supporting mechanism 50. The second supporting arm 70 is disposed as two segment joint, with the supporting mechanism 50 being provided on its one end. As the second supporting mechanism 50 rotates, the other end of the second supporting arm 70 is swung around a central axis of the second supporting mechanism 50 to the right and the left in a horizontal direction.

A monitor attaching portion 80 is disposed on a seat 76 provided on the other end of the second supporting arm 70. The monitor attaching portion 80 is structured to be reciprocatingly rotatable in a horizontal direction around a vertical central axis on the other end of the second supporting arm 70. Still further, the monitor attaching portion 80 comprises an angle adjusting portion 81 having a horizontal rotation axis and an attaching plate 82 reciprocatingly rotatable around the rotation axis of the angle adjusting portion 81. Four holes 82 a are provided on an attaching plate 82. The attaching plate 82 is screwed to a display device for monitor 300 using four screws 310 passing through the holes 82 a.

Next, an overall structure of a supporting device 100 is described further in detail with reference to FIGS. 3 to 11.

Figure 4:
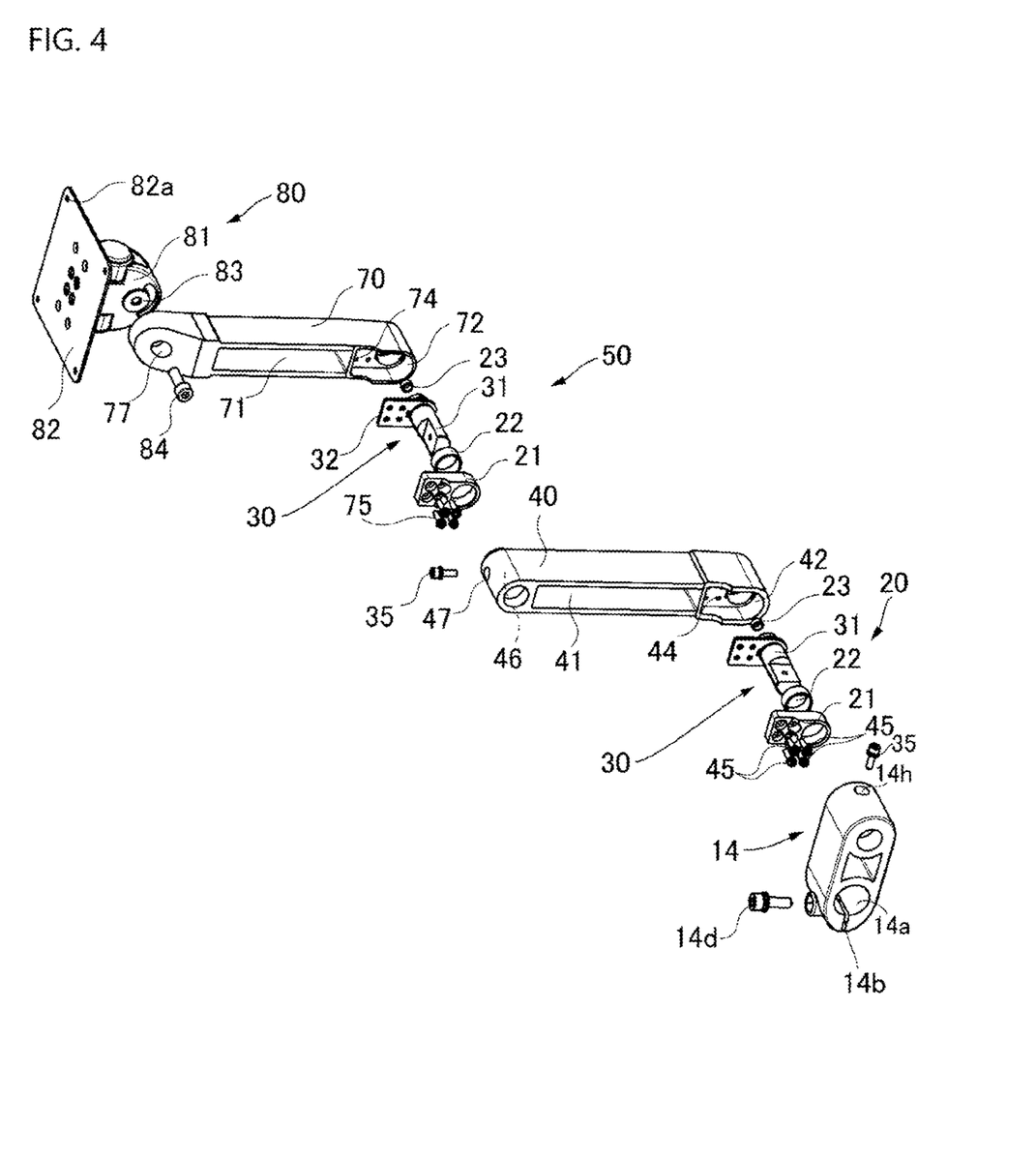
FIG. 4 shows an exploded perspective view of a supporting device as shown in FIG. 1.

As shown in FIGS. 3 and 4, a first supporting mechanism 20 comprises a fixing guide member 21, a first shaft bearing member 22 being a first shaft bearing, a swivel torque hinge 30 and a second shaft bearing member 23 being a second shaft bearing. A second supporting mechanism 50 has the same structure as the first supporting mechanism 20. Therefore, the second supporting mechanism 50 as in the first supporting mechanism 20 comprises a fixing guide member 21, a first shaft bearing member 22, a swivel torque hinge 30 and a second shaft bearing member 23. The first shaft bearing member 22 and the second shaft bearing member 23 are both highly durable polyamide resin products in embodiments.

A groove portion 41 facing downward for reducing weight is provided on a first supporting arm 40. A hinge housing portion 42 being an opening facing downward for housing a swivel torque hinge 30 is provided on one end of the first supporting arm 40. A bush carrier 43 being an opening facing downward for housing a cylindrical second shaft bearing member 23 is provided on an upper end portion of the hinge housing portion 42. A shaft carrier 46 and a lock portion 48 for supporting a hinge shaft 31 are provided on the other end of the first supporting arm 40, in the same manner as a shaft carrier 16 and a lock portion 18. Still, instruction symbol 47 is an insert hole of screw 35 for attached the hinge shaft 31 to the shaft carrier 46.

A groove portion 71 facing downward for reducing weight is provided on a second supporting arm 70. A hinge housing portion 72 being an opening facing downward for housing a swivel torque hinge 30 is provided on one end of the second supporting arm 70. A bush carrier 73 being an opening facing downward for housing a cylindrical second shaft bearing member 23 is provided on an upper end portion of the hinge housing portion 72.

An assembly of a first supporting mechanism 20 to a first supporting arm 40 is described later, with reference to FIGS. 8 to 11. As a second supporting mechanism 50 has a structure similar to the first supporting mechanism 20, an assembly of a second supporting mechanism 50 to a second supporting arm 70 is similar as well.

A hole 77 being a counter boring passing through a seat 76 is provided on the other end of the second supporting arm 70. A screw hole 83 facing downward is provided on an angle adjusting portion 81 of a monitor attaching portion 80. A screw 84 passes through the hole 77 to fasten and fix the second supporting arm 70 and an angle adjusting portion 81 of a monitor attaching portion 80.

Figure 5A:
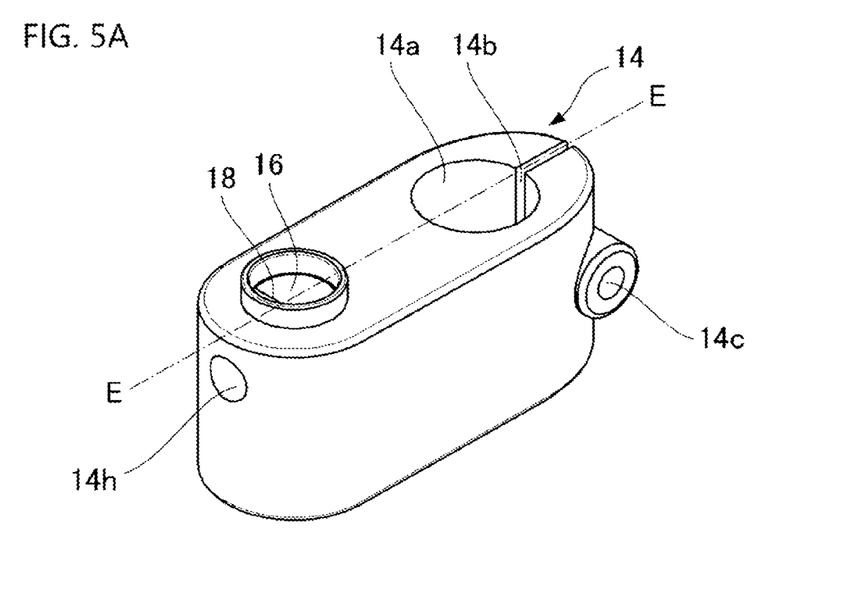
FIGS. 5A and 5B show an attaching element of a damper hinge as shown in FIG. 4, FIG. 5A being its perspective view, and FIG. 5B—its cross section in line E-E of FIG. 5A.
Figure 5B:
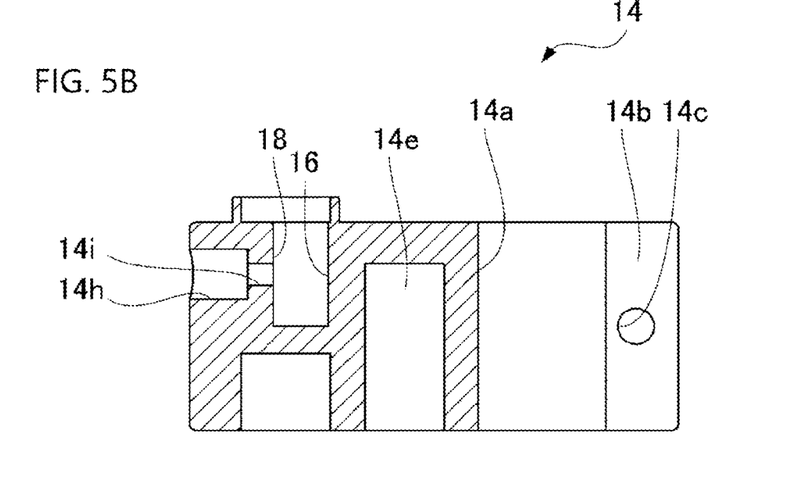
Figure 9:
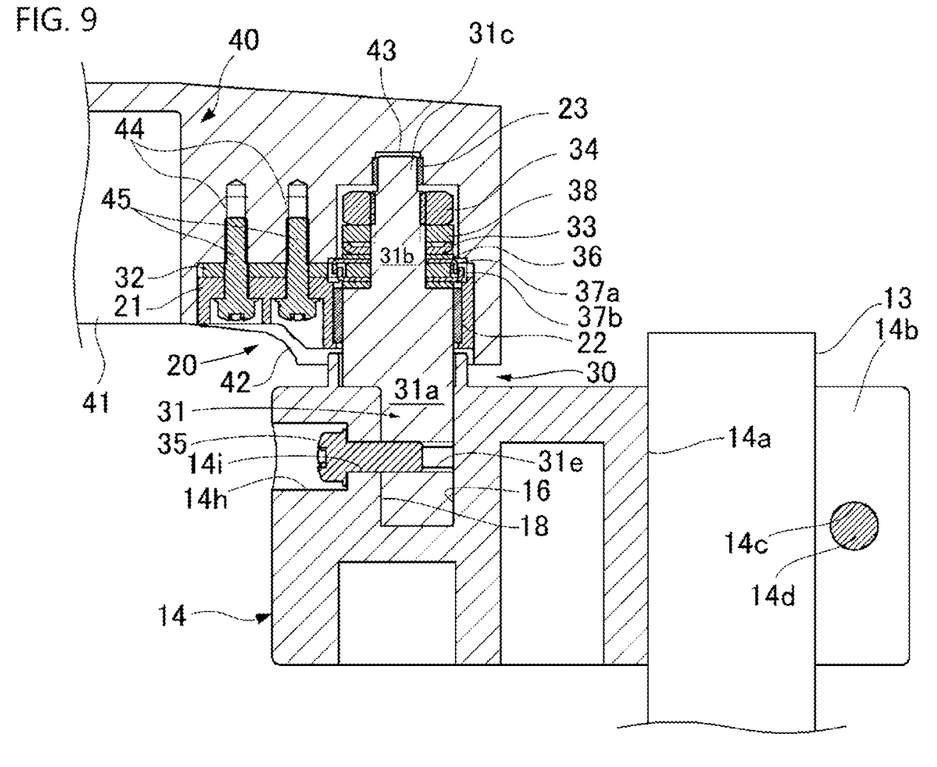
FIG. 9 shows a partially enlarged cross section of a section around a swivel torque hinge as shown in FIG. 3.

As shown in FIGS. 9, 5A and 5B an attaching member 14 has the elliptic shape in a plan view, wherein a column 13 is loosely inserted into an insertion hole 14a formed on its one end, an expanding slot 14b is provided outward from the insertion hole 14a, and a fastening screw 14d is screwed into a female screw hole 14c provided in a direction perpendicular to the expanding slot 14b. The insertion hole 14a, a cavity 14e and a shaft carrier 16 are formed on an attaching member 14 in the order from its end to the other end, and a flat lock portion 18 is formed on the shaft carrier 16 on its side opposite to the insertion hole 14a. The shaft carrier 16 having the lock portion 18 is formed substantially in the same shape as a cross-sectional shape of a lock portion 31d of a hinge shaft 31, and the hinge shaft 31 is nonrotatably inserted into a deformed attaching hole 14f, with the lock portion 31d being restrained by the lock portion 18. A hole 14i following an insertion hole 14h being a counter boring is provided on a lateral face of the shaft carrier 16, a fastening screw 35 inserted into an insertion hole 14h is screwed to a screw hole 31e of the hinge shaft 31 via a hole 14i, so that the hinge shaft 31 is fixedly attached to the attaching member 14.

In other words, the hinge shaft 31 comprises a lock portion 31d being a flat portion wherein a portion of a cylinder is cut off downward along a central axis inside a shaft trunk 31a. A portion provided with the lock portion 31d is inserted into a shaft carrier 16 comprising a lock portion 18 of an attaching member 14, and a flat portion of the lock portion 31d and a flat portion of the lock portion 18 face each other. The screw hole 31e is provided on the lock portion 31d, perpendicular to the flat portion of the lock portion 31d. A screw 35 is inserted into the screw hole 31e, via a hole 14i of the attaching member 14.

Figure 6A:
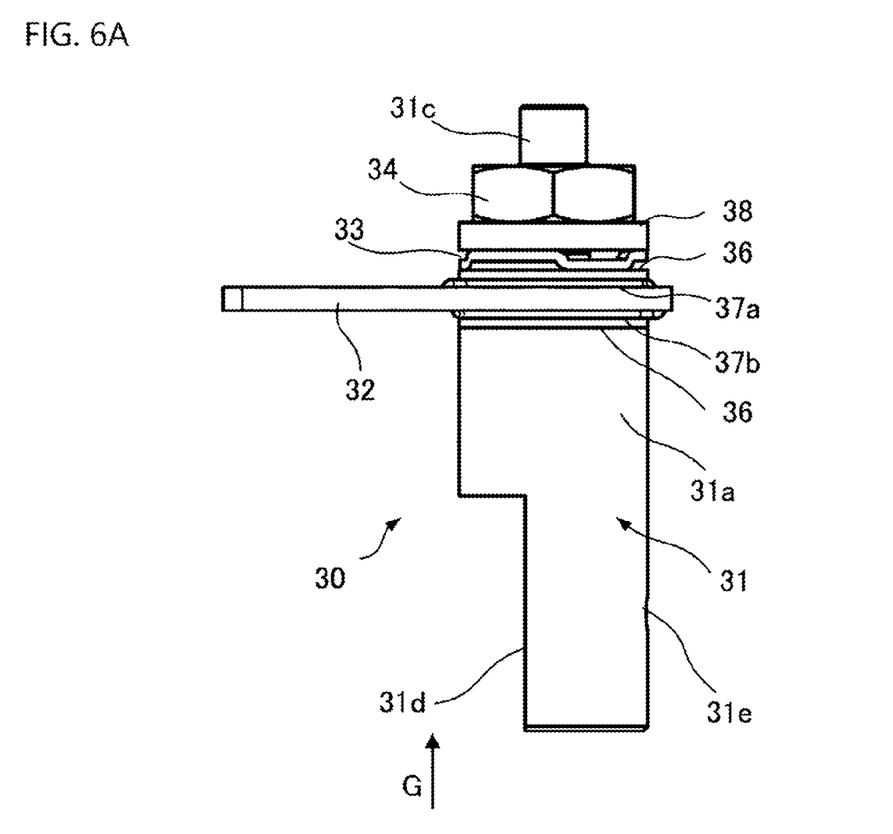
FIGS. 6A and 6B show a swivel torque hinge being a supporting mechanism of a supporting device shown in FIG. 4, FIG. 6A being its elevation view, and FIG. 6B—its detail drawing viewing from G.
Figure 6B:
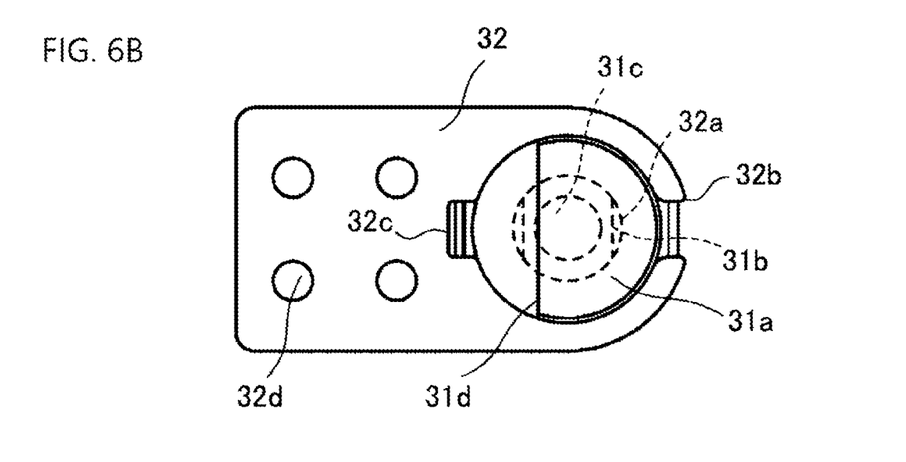
Figure 7:
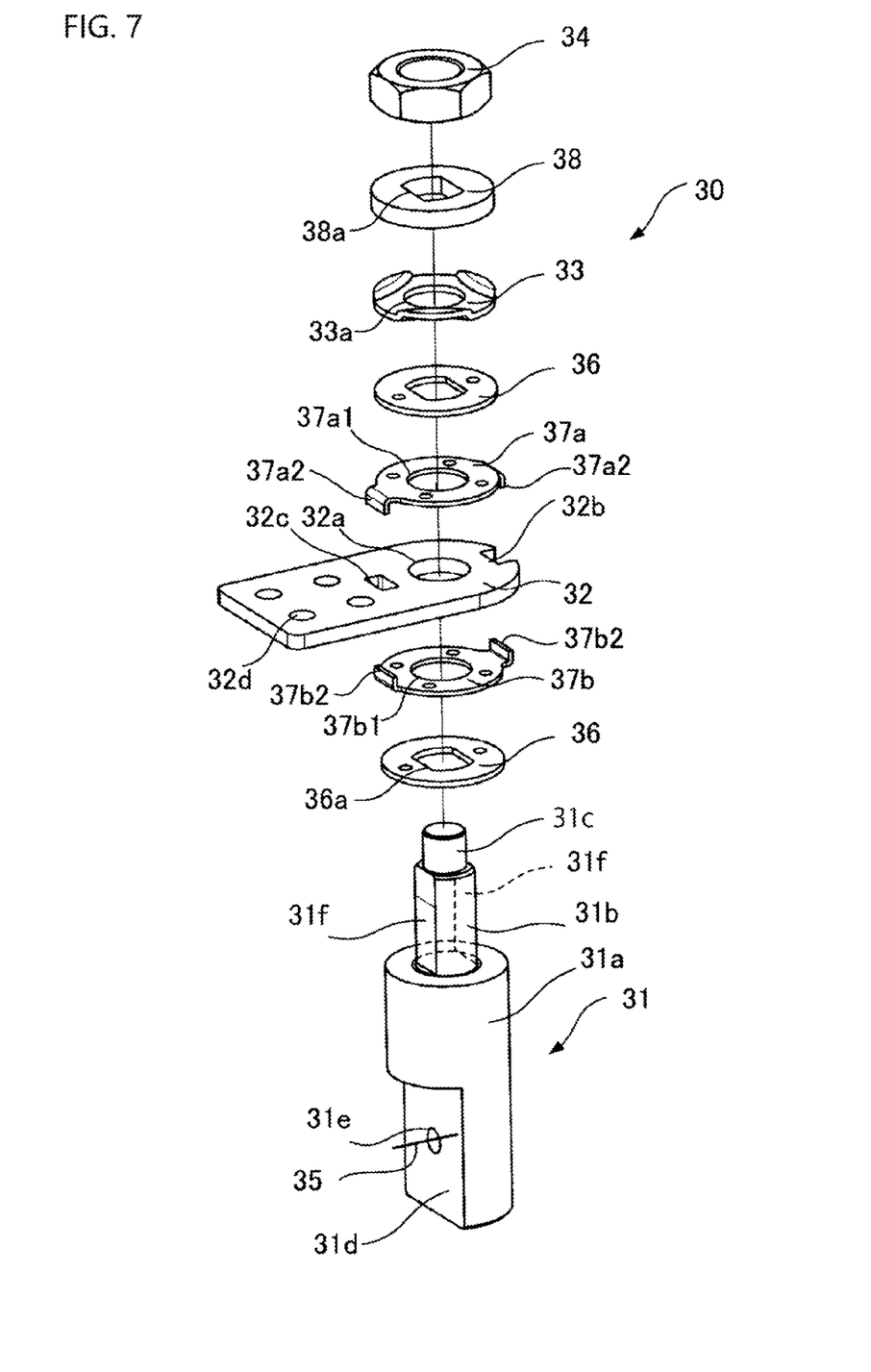
FIG. 7 shows an exploded perspective view of a swivel torque hinge of a supporting device shown in FIG. 6.

As shown in FIGS. 6A, 6B and 7, a swivel torque hinge 30 consists of an assembly of a hinge shaft 31, a friction washer 36, a friction washer 37b, a bracket 32, a friction washer 37a, a friction washer 36, a spring washer 33, a flat washer 38 and a screw 35, in order from below. All these components without the screw 35 are assembled to a screw portion 31b.

The screw portion 31b is provided above a shaft trunk 31a of the hinge shaft 31, wherein it has an outer diameter longer than that of the shaft trunk 31a and a male screw is formed on its portion. The screw portion 31b has an outer surface on which a pair of flat portions 31f, 31f are formed by cutting off lateral surfaces of a cylinder in parallel along an axial direction. The screw portion 31b is a detent for two friction washers 36 having holes fit for the pair of flat portions 31f, 31f of the screw portion 31b, while the flat washer 38 is a detent for the hinge shaft 31.

A shaft upper portion 31c having an outer diameter shorter than that of the screw portion 31b is provided above the screw portion 31b.

The two friction washers 36 are circular plate members. Each of the friction washers 36 has holes 36a fit for outer surfaces of a pair of cylindrical flat portions 31f, 31f of the screw portion 31b.

The friction washers 37a, 37b are circular plate members. The friction washer 37a has a circular hole 37a1 and claws 37a2, 37a2 being a pair of projections to be inserted into a fixing portion 32b and a fixing portion 32c. The friction washer 37b has a circular hole 37b1 and claws 37b2, 37b2 being a pair of projections to be inserted into a fixing portion 32b and a fixing portion 32c.

A bracket 32 is component formed from a flat plate. A circular hole 32a fit for a circumferential outer surface of a screw portion 31b, a fixing portion 32b being a notch for detent of the friction washers 37a, 37b, a locking hole 32c for detent of the friction washers 37a, 37b and four attaching holes 32d for fixing screws are provided on the bracket 32.

As two friction washers 37a, 37b are assembled with the bracket 32 between them, the friction washer 36 and the friction washer 37a on one hand, and the friction washer 36 and the friction washer 37b on the other rotate with friction relative to each other. Still further, the bracket 32 and the friction washers 37a, 37b are integrally structured to be rotatable relative to a hinge shaft 31.

A spring washer 33 is a disk-shaped member having a circular hole 33a and a spring-like urging member for urging a friction washer 36, the friction washers 37a, 37b and the bracket 32 in an axial direction.

The flat washer 38 is a circular plate member. The flat washer 38 has holes 36a fit for outer surfaces of a pair of cylindrical flat portions 31f, 31f of the screw portion 31b.

In the following, an assembly of respective components of a first supporting mechanism 20 is described, with reference to FIGS. 8 to 11.

Figure 11A:
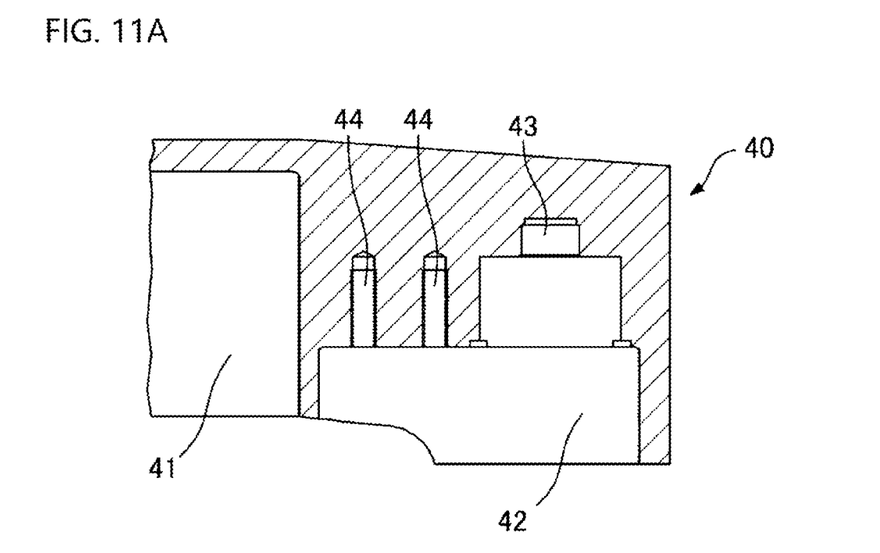
FIGS. 11A and 11B show a structure of a section of a supporting arm to which a swivel torque hinge is attached, FIG. 11A being its vertical cross section, and FIG. 11B its bottom view.
Figure 11B:
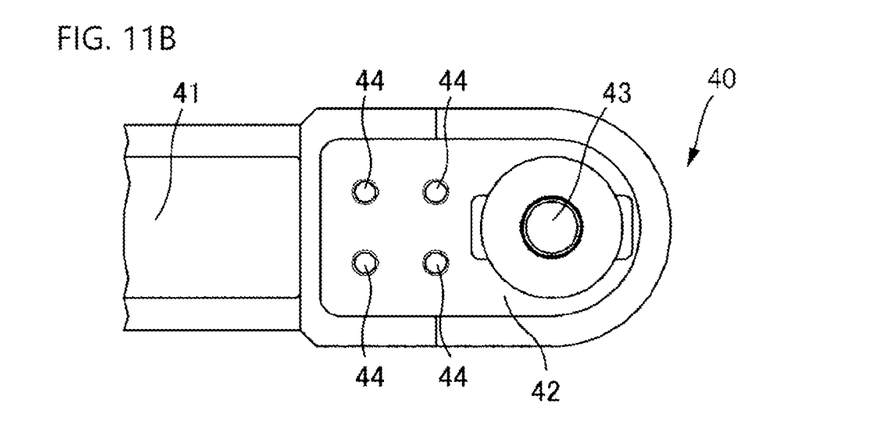

As shown in FIG. 9, a fixing guide member 21, a first shaft bearing member 23 being a first shaft bearing and a swivel torque hinge 30 of a first supporting mechanism 20 is assembled to a hinge housing portion 42 of a first supporting arm 40 shown in FIGS. 11A and 11B.

Figure 8A:
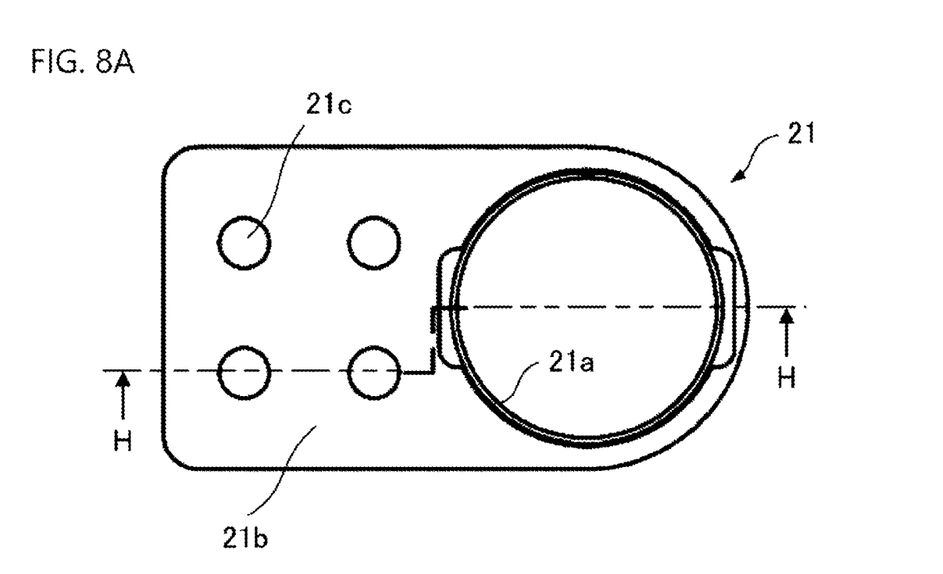
FIGS. 8A and 8B show the fixing guide member of a supporting device as shown in FIG. 4, FIG. 8A being its plan view, and FIG. 8B—its cross section in line E-E of FIG. 8A.
Figure 8B:
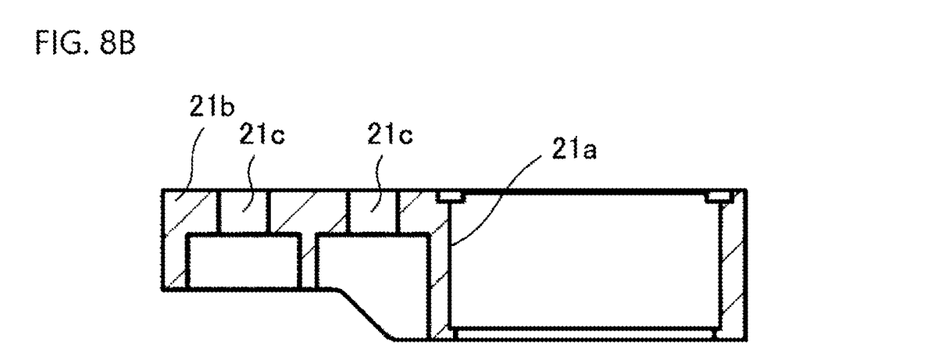

A bush carrier 21a being an opening facing upward for housing a cylindrical first shaft bearing member 22 is provided on the fixing guide member 21 shown in FIGS. 8A and 8B. It is noted that the bush carrier 21a has an opening downward, as a shaft trunk 31a passes through. Still further, the fixing guide member 21 projects in the tab shape next to a first portion on which the bush carrier 21a is provided, comprising an attaching portion 21b being a second portion of a plate thickness smaller than the first portion, and four holes 21c being a counter boring for fixing a screw from below.

Figure 10A:
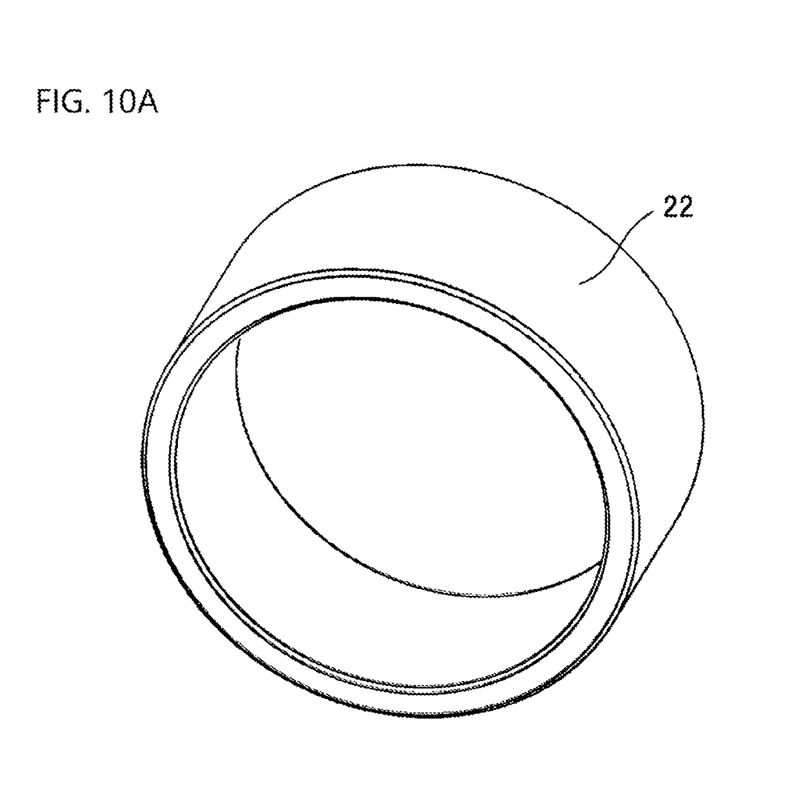
FIGS. 10A and 10B show perspective views of shaft bearing members according to an embodiment of the invention, FIG. 10A being a perspective view of a first shaft bearing member and FIG. 10B—a perspective view of a second shaft bearing member.

A first shaft bearing member 22 shown in FIG. 10A is an oil-less slide bearing formed in the cylindrical shape. The first shaft bearing member 22 is inserted into a bush carrier 21a of a fixing guide member 21. A shaft trunk 31a of a hinge shaft 31 of a swivel torque hinge 30 is inserted inside the bush carrier 21a.

Figure 10B:
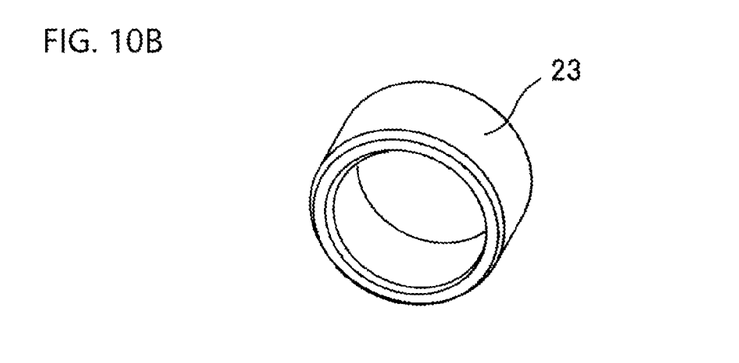

A second shaft bearing member 23 shown in FIG. 10B is an oil-less slide bearing formed in the cylindrical shape. An outer diameter and an inner diameter of the second shaft bearing member 23 are both longer than an outer diameter and an inner diameter of the first shaft bearing member 22. A shaft upper portion 31c of the hinge shaft 31 is inserted into the second shaft bearing member 23. The second shaft bearing member 23 is inserted into a bush carrier 43 of a first supporting arm 40.

Then, the upper end portion 31c of the hinge shaft 31 is borne by the second shaft bearing member 23 attached to a shaft bearing hole portion provided on a supporting arm 40, a shaft trunk 31a of the hinge shaft 31 is borne by the first shaft bearing member 22, and relative to the supporting arm 40, the fixing guide member 21 and the bracket 32 are jointly fastened to four female holes 44 provided on the supporting arm 40 via four holes 21c of a fixing guide member 21 and via four holes 32d of the bracket 32 of a swivel torque hinge 30.

When structured in this manner, even if a downward force F based on a mass e.g. of ca. 10 kg is applied to the monitor attaching portion 80, a large offset load applied to a spring washer 33 can be prevented. As a result, a rotation torque on a first supporting mechanism 20 and a second supporting mechanism 50 is stabilized, a durability is improved. Still further, a hanging down of the monitor attaching portion 80 can be reduced, and a durability of the friction torque generating mechanism enhanced.

Next, an operation of the supporting device 100 according to this embodiment is described. The position in a vertical direction of the display device for monitor 300 is adjusted by adjusting the attaching position of the lifting device 10 relative to the column 13, and the position is held by the fastening screw 14 d. Still further, in the display device for monitor 300, the fixing end of the first supporting arm 40 is attached to the attaching member 14 via the first supporting mechanism 20, and the fixing end of the second supporting arm 70 to the first supporting arm 40 via the second supporting mechanism 50, so that the position in horizontal and longitudinal directions. Then, friction torque is generated by the friction torque generating mechanism of the swivel torque hinge 30 of the first supporting mechanism 20 and the friction torque generating mechanism of the swivel torque hinge 30 of the second supporting mechanism 50, and the position of the display device for monitor 300 in a horizontal direction is stopped and held at any position.

It is noted that FIG. 9 shows an embodiment of assembling the first supporting mechanism 20 to the hinge housing portion 42 of the first supporting arm 40. In contrast, an embodiment of assembling the second supporting mechanism 50 to the hinge housing portion 72 of the second supporting arm 70 is also as in the first supporting mechanism 20.

Still further, the invention is not limited to the above-mentioned embodiment, but various variations and applications are possible.

In the above-mentioned embodiment, the lifting device 10 capable of lifting the attaching member 14 is fixed by screws to the work desk 200. When structured in this manner, the embodiment has an advantage that the height of the display device for monitor 300 can be adjusted, but it is not limited to that. Its attaching method and attaching form are optional. Therefore, the structure in which an attaching member 14 is directly attached to equipment such as a work desk 200 is also possible.

In the above-mentioned embodiment, the first supporting mechanism 20 assembled to the first supporting arm 40 and the second supporting mechanism 50 assembled to the second supporting arm 70 use the same parts. In contrast, the structure in which a first supporting mechanism 20 and a second supporting mechanism 50 use swivel torque hinges of different size is also possible.

In the above-mentioned embodiment, equipment which the supporting device 100 supports is the display device for monitor 300. In contrast, the invention is applicable not only to a display device for monitor, but also to a supporting mechanism and a supporting device using the supporting mechanism supporting various kinds of equipment such as telephone set, office equipment, etc. and having rotatable arms extending in a horizontal direction, wherein a downward force is applied to a free end side of the arms.

What is claimed is:

1. A supporting mechanism for a supporting device which supports supporting arm(s) to which a pressing down load is applied on one side relative to an attaching element such that the supporting arm(s) is/are mobile at least in a horizontal direction, wherein a swivel torque hinge is used for the support mechanism by accommodating it in a hinge housing on the support arm, wherein the swivel torque hinge consists of a hinge shaft, a screw portion provided above one side of the hinge shaft, wherein it has an outer diameter longer than that of the hinge shaft and its outer circumference is deformed in the axial direction and a male screw is formed, an upper part of the shaft following this screw portion, a fixed guide member rotatably attached to the hinge shaft, a first friction washer and a second friction washer attached to the screw portion in order from the bottom, a support member attached to the support arm together with the fixed guide member, the upper part of the shaft is shaft-supported by a bush receiver at the inner top of the housing, the first friction washer and a fourth friction washer are constrained in rotation by the screw portion, the second friction washer and the third friction washer are engaged with the support member such that they can rotate with the support member.

2. The supporting mechanism according to claim 1, wherein shaft bearing member(s) is/are mounted on one or both of said supporting arm(s), said fixing guide member and said upper part of the shaft.

3. The supporting mechanism according to claim 1, wherein, if a plurality of said supporting arms are used, said supporting mechanism is also used at coupling points between said supporting arms.

4. The supporting mechanism according to claim 1, wherein a hinge shaft of said swivel torque hinge is attached to an attaching element via attaching mechanism.

5. The supporting mechanism according to claim 1, wherein a hinge shaft of the swivel torque hinge is attached to one of said supporting arms, where a plurality of said supporting arms are given.

6. The supporting mechanism according to claim 1, wherein an attaching element is a supporting base such as a desk.

7. A supporting device using a supporting mechanism according to claim 1.

* * * * *